United States Patent
Zhang et al.

(10) Patent No.: US 11,767,574 B2
(45) Date of Patent: Sep. 26, 2023

(54) ULTRAHIGH-STRENGTH MARAGING STAINLESS STEEL WITH MULTIPHASE STRENGTHENING AND PREPARATION METHOD THEREOF

(71) Applicant: Harbin Engineering University, Harbin (CN)

(72) Inventors: Zhongwu Zhang, Harbin (CN); Junpeng Li, Harbin (CN)

(73) Assignee: Harbin Engineering University, Harbin (CN)

( * ) Notice: Subject to any disclaimer, the term of this patent is extended or adjusted under 35 U.S.C. 154(b) by 0 days.

(21) Appl. No.: 17/865,670

(22) Filed: Jul. 15, 2022

(65) Prior Publication Data

US 2023/0072654 A1   Mar. 9, 2023

(30) Foreign Application Priority Data

Aug. 25, 2021 (CN) .......................... 202110982722.1
Apr. 7, 2022  (CN) .......................... 202210365543.8

(51) Int. Cl.

| | | |
|---|---|---|
| C21D 9/46 | (2006.01) | |
| C21D 8/02 | (2006.01) | |
| C21D 1/28 | (2006.01) | |
| C21D 1/18 | (2006.01) | |
| C21D 6/00 | (2006.01) | |
| C22C 38/52 | (2006.01) | |
| C22C 38/50 | (2006.01) | |
| C22C 38/44 | (2006.01) | |
| C22C 38/04 | (2006.01) | |
| C22C 38/02 | (2006.01) | |
| C22C 38/00 | (2006.01) | |

(52) U.S. Cl.
CPC .............. *C21D 9/46* (2013.01); *C21D 1/18* (2013.01); *C21D 1/28* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0236* (2013.01); *C22C 38/002* (2013.01); *C22C 38/02* (2013.01); *C22C 38/04* (2013.01); *C22C 38/44* (2013.01); *C22C 38/50* (2013.01); *C22C 38/52* (2013.01)

(58) Field of Classification Search
None
See application file for complete search history.

(56) References Cited

U.S. PATENT DOCUMENTS

2020/0080164 A1* 3/2020 Vartanov ................. C22C 38/50

* cited by examiner

*Primary Examiner* — Anthony M Liang
(74) *Attorney, Agent, or Firm* — Schaffer, Schaub & & Marriott, Ltd.

(57) ABSTRACT

Disclosed is an ultrahigh-strength maraging stainless steel with multiphase strengthening and a preparation method thereof. The stainless steel has a composition in mass percentage as follows: 1.0-5.0% of Co, 6.0-10.0% of Ni, 11.0-17.0% of Cr, 0.3-2.0% of Ti, 3.0-7.0% of Mo, 0.08-1.0% of Mn, 0.08-0.5% of Si, 0.02% or less of C, 0.003% or less of P, 0.003% or less of S, and Fe as a balance.

11 Claims, 3 Drawing Sheets

ULTRAHIGH-STRENGTH MARAGING STAINLESS STEEL WITH MULTIPHASE STRENGTHENING AND PREPARATION METHOD THEREOF

CROSS REFERENCE TO RELATED APPLICATIONS

This patent application claims the benefit and priority of Chinese Patent Application No. 202110982722.1 filed on Aug. 25, 2021 and Chinese Patent Application No. 202210365543.8 filed on Apr. 7, 2022, the disclosure of which is incorporated by reference herein in its entirety as part of the present application.

TECHNICAL FIELD

The present disclosure belongs to the technical field of martensitic stainless steels, and particularly relates to an ultrahigh-strength maraging stainless steel with multiphase strengthening and a preparation method thereof.

BACKGROUND ART

Maraging stainless steel is a new type of steel developed in the 1960s, which has both the strength of maraging steel and corrosion resistance of stainless steel. Due to the excellent comprehensive mechanical properties thereof, the maraging stainless steel is commonly used in the fields of critical and high-end equipment in aviation, aerospace and navigation.

The main reason for the maraging stainless steel to achieve ultrahigh strength is the superposition of martensitic transformation strengthening and precipitation strengthening, and its corrosion resistance is attributed to a passive film formed on the surface thereof via addition of Cr and Mo. Table 1 shows the compositions and performances of commercially-available high-strength stainless steels at present. It may be seen that the current high-strength stainless steel has the following problems: on one hand, there is the trade-off between strength and ductility; on the other hand, when the mechanical properties are excellent, the corrosion resistance is relatively poor. As a result, it is very difficult to combine the strength, the plasticity and toughness and the corrosion resistance together to obtain excellent comprehensive performances. Thus, it may be seen that it is a research hotspot and difficulty in the field of stainless steel to improve the strength and toughness of stainless steel on the premise of maintaining corrosion resistance, so as to meet higher requirements in engineering application on the comprehensive performance of stainless steel. Accordingly, it is urgent to develop a novel ultrahigh-strength maraging stainless steel with independent intellectual property rights.

TABLE 1

Composition and performance of commercially-available high-strength stainless steels currently

| Material designation | Cr | Ni | Mo | Co | Others | Rm/MPa | Elongation/% | Pitting potential/$V_{SCE}$ |
|---|---|---|---|---|---|---|---|---|
| 17-4PH | 15.0-17.5 | 3.0-5.0 | | | Nb: 0.15-0.45 Cu: 3.0-5.0 | 1370 | 15 | −0.060 |
| 15-5PH | 14.0-15.5 | 3.5-5.5 | | | Cu: 2.5-4.5 Nb: 0.15-0.45 | 1380 | 14 | −0.027 |
| PH13-8Mo | 12.2-13.2 | 7.5-8.5 | 2.0-2.5 | | Al: 0.9-1.35 | 1620 | 10 | 0.054 |
| PyrometX-23 | 9.5-10.5 | 6.5-7.5 | 5.0-6.0 | 9.5-11.0 | | 1780 | 15 | |
| Custom475 | 10.5-11.5 | 7.5-8.5 | 4.5-5.5 | 8.0-9.0 | Al: 1.0-1.5 | 1980 | 6 | |
| D70 | 11.5-12.5 | 4.0-5.0 | 4.0-5.0 | 12.0-14.0 | | 1650 | 9.5 | |
| FerriumS53 | 10.0 | 5.5 | 2.5 | 14 | W: 1.0, V: 0.3 | 1960 | 12 | |

A higher content of Co makes the high-strength stainless steel show a better mechanical property, while the comprehensive mechanical property is relatively poor as the content of Co is lower or 0. The addition of Co into the high-strength stainless steel is a double-edged sword. Co may decrease the solubility of Ti and Mo in a martensite matrix to thus form a nanoprecipitate containing Mo or Ti, thereby increasing the strength. Meanwhile, Co may also hinder recovery of dislocations, reduce the size of the precipitates and stabilize the martensite matrix, thereby producing a relatively high secondary hardening to guarantee the desirable mechanical properties such as strength. Therefore, it is inevitable to add a large amount of Co element in order to obtain excellent mechanical properties. However, Co may promote the spinodal decomposition of Cr in the maraging stainless steel, and a higher content of Co leads to a greater extent of spinodal decomposition of Cr, which may reduce the pitting corrosion resistance of the matrix. Therefore, Co should be introduced in an appropriate amount. In the present disclosure, a special structure is formed innovatively by optimization of alloying elements, vacuum induction melting-vacuum arc remelting (VIM-VAR) and corresponding thermomechanical treatments. The structure includes a martensitic lath and an amorphous layer modified by a lath boundary, where the martensitic lath includes various nanoscale precipitates in dispersed distribution. An ultrahigh strength is achieved by synergistic strengthening of the various nanoprecipitates; meanwhile, the lath boundary modified by the amorphous layer not only promotes dislocation multiplication but also absorbs the dislocations, thereby achieving high plasticity and great work hardening capacity. Further, the presence of reverted austenite also contributes to the plasticity and toughness of the material. In the stainless steel of the present disclosure, on one hand, the carbon content is greatly reduced by using nanoprecipitates strengthening to replace the carbon strengthening; on the other hand, a pitting corrosion resistance equivalent of the alloy is improved by optimization of the composition. The extremely low carbon content and the high pitting corrosion resistance equivalent both ensure an excellent corrosion resistance of the stainless steel in the present disclosure. Therefore, compared with existing stainless steels, the stainless steel of the present disclosure has an improvement in both mechanical properties and corrosion resistance.

Chinese patent application CN 102031459 A discloses a W-containing high-strength and high-toughness secondary hardening stainless steel. The steel comprises the following chemical constituents in percentage by weight (wt %): 0.10-0.20% of C, 11.0-13.0% of Cr, 2.0-3.5% of Ni, 3.5-5.5% of Mo, 12-15% of Co, 0.8-3.0% of W, 0.1-0.6% of V, 0.01-0.06% of Nb, 0.2% or less of Si, 0.2% or less of Mn, 0.01% or less of S, 0.01% or less of P, 30 PPm or less of O, 30 PPm or less of N, and Fe as a balance. The stainless steel has yield strength of 1,300-1,600 MPa, tensile strength of 1,920-2,030 MPa and plasticity of 10-13.5%. U.S. Pat. No. 7,160,399 B2 discloses ultrahigh-strength corrosion-resistant steels, among which the alloy branded as Ferrium S53 has a nominal composition as follows (wt %): 14.0% of Co, 10.0% of Cr, 5.5% of Ni, 2.0% of Mo, 1.0% of W, 0.30% of V, 0.21% of C, and Fe as a balance; the alloy Ferrium S53 has an ambient ultimate tensile strength of about 1980 MPa and an ambient 0.2% yield stress of about 1560 MPa. Chinese patent application CN 110358983A discloses precipitation-hardened martensite stainless steel and a preparation method thereof. The steel comprises the following chemical constituents in percentage by weight (wt %): 0.14-0.20% of C, 13.0-16.0% of Cr, 0.5-2.0% of Ni, 12.0-15.0% of Co, 4.5-5.5% of Mo, 0.4-0.6% of V, 0.1% or less of Si, 0.5% or less of Mn, 0.01% or less of P, 0.01% or less of S, 0.10% or less of N, and Fe as a balance. The stainless steel has a tensile strength of 1,840-1,870 MPa, yield strength of 780-820 MPa and an elongation of 12.5-14.0%. The three technical solutions above may achieve performances of a high-strength stainless steel. However, due to a relatively high Co additive amount, the cost of raw materials is high; also, an increase in Co content causes spinodal decomposition of Cr, further resulting in Cr-depleted and Cr-enriched regions to reduce the corrosion resistance. Moreover, the carbon content is relatively high, and this may seriously deteriorate the corrosion resistance; besides, the size, morphology and distribution of carbides in a matrix are difficult to be controlled, and when the carbides have a relatively large size and exist on a crystal boundary, the mechanical properties may be seriously deteriorated. Furthermore, the processes of CN 110358983 A and Ferrium S53 both require two aging treatments and two cryogenic treatments, and thus are complicated.

Chinese patent application CN 107653421 A discloses a super-high-strength martensite aging stainless steel resistant to seawater corrosion. The steel comprises the following chemical constituents in percentage by weight (wt %): 0.03% or less of C, 13.0-14.0% of Cr, 5.5-7.0% of Ni, 5.5-7.5% of Co, 3.0-5.0% of Mo, 1.9-2.5% of Ti, 0.1% or less of Si, 0.1% or less of Mn, 0.01% or less of P, 0.01% or less of S, and Fe as a balance. The stainless steel has a tensile strength of 1,926-2,032 MPa, yield strength of 1,538-1,759 MPa, an elongation of 7.5-13% and a pitting potential Epit of not less than 0.15 V. Although the strengthening mechanism in the patent is precipitation strengthening, the type of precipitated phase in the patent is different from that of the present disclosure; compared with those of the present disclosure, the mechanical properties and corrosion resistance achieved in the patent are lower, indicating that the strengthening and toughening mechanisms and corrosion resistance between the patent and the present disclosure are totally different.

Chinese patent application CN 108251760A disclose martensite stainless steel reinforced through nano-phase composite precipitation and a manufacturing method thereof. The stainless steel comprises the following chemical constituents in percentage by weight (wt %): 0.001-0.20% of C, 10.0-18.0% of Cr, 3.0-12.0% of Ni, 0.50-6.0% of Mo, 0.35-3.50% of Cu, 0.20-5.0% of Mn, 0.25-1.50% of Ti, 0.10-1.0% of Al, 0.15-1.0% of Si, and Fe and inevitable impurity elements as a balance. The stainless steel has yield strength greater than 1,100 MPa, a tensile strength greater than 1,800 MPa and elongation at break of greater than 8%. According to the technical solution, the carbon content is relatively high, and this may seriously deteriorate the corrosion resistance; also, the size, morphology and distribution of carbides in a matrix are difficult to be controlled, and when the carbides have a relatively large size and exist on a crystal boundary, mechanical properties may be seriously deteriorated. Moreover, the two-grade aging process used is difficult in controlling the size and distribution of various nanoprecipitates, and when the nanoprecipitates grow, the strengthening effect brought thereby may disappear and the corrosion resistance may be deteriorated due to the segregation of elements. Furthermore, the process is relatively complicated.

SUMMARY

Aiming at the problems of complicated preparation process, low corrosion resistance and poor mechanical property of the existing ultrahigh-strength stainless steels, the present disclosure provides herein an ultrahigh-strength maraging stainless steel with multiphase strengthening and a preparation method thereof.

The ultrahigh-strength maraging stainless steel with multiphase strengthening according to the present disclosure has a composition as follows in mass percentage: 1.0-5.0% of Co, 6.0-10.0% of Ni, 11.0-17.0% of Cr, 0.3-2.0% of Ti, 3.0-7.0% of Mo, 0.08-1.0% of Mn, 0.08-0.5% of Si, 0.02% or less of C, 0.003% or less of P, 0.003% or less of S, and Fe as a balance.

The inventive principle and composition design basis of the ultrahigh-strength maraging stainless steel with multiphase strengthening are as follows.

Inventive principle. According to the present disclosure, the carbon strengthening on the stainless steel is not used, and the carbon content is controlled at an extremely low level instead, thereby improving both the toughness and the corrosion resistance of the stainless steel. However, the ultralow carbon content causes a serious problem of low strength. In the present disclosure, a special structure is formed by optimization of alloying elements, VIM-VAR and corresponding thermomechanical treatments. The structure includes a martensitic lath and an amorphous layer modified by a lath boundary, where the martensitic lath includes various nano-scale precipitates in dispersed distribution. Ice-water quenching and a high cold rolling deformation make the martensitic laths exhibit a tiny size and an increased dislocation density, and these fine and high-dislocation density martensitic laths may provide nucleation sites for the precipitated phase. Meanwhile, the high-density dislocations and defects among the lamellar structure of these nano-scale laths concentrate a large amount of lattice strain, and a large amount of elastic strain energy is formed due to the inconsistence among atoms. To release the elastic strain energy there among, the atoms have to interact with each other. As a result, the lattice is locally destroyed and atomic arrangement becomes disordered, resulting in nucleation regions of an amorphous structure. The lath boundary has a relatively strong attraction to the atoms. Thus, during aging, the elements are distributed to the lath boundary, and this further increases the disorder of the lath boundary and enhances the formation ability of amorphous substance on the lath boundary. During deformation, the composite structure above contributes extremely high yield strength through the precipitation strengthening of various nanoprecipitates. Moreover, after yielding, the nano-scale amorphous phase at boundary may promote dislocation multiplication to provide plasticity and strength on the one hand, and may absorb dislocations to avoid fractures caused by the entanglement and hardening due to excessive dislocations so as to further provide work hardening on the other hand, thereby achieving an ultrahigh strength and a high plasticity. Furthermore, during the thermomechanical treatments, reverted austenite is precipitated from the matrix, and these precipitates may also delay the stress concentration of materials during deformation to ensure the plasticity.

According to the present disclosure, the nanoprecipitates of a Mo-enriched R' phase, an $\alpha'$-Cr nano-phase and a $Ni_3$(Ti, Mo) are formed by adjusting the contents of Ni, Ti, Mo and Si, which achieve improvement in strength through synergistic strengthening. The three strengthening nanoprecipitates substantially show synergistic precipitation. In an early stage of aging, small Ni—Ti—Mo—Si clusters in dispersed distribution are formed inside the martensitic laths or on the dislocations. With the extension of aging time, Mo and Si are gradually expelled from the clusters, and a nano-scale $Ni_3$(Ti, Mo) strengthening phase is formed. After a heat preservation, Mo and Si are completely expelled out and form on the surface of $Ni_3$Ti a Mo-enriched R' phase, which wraps $Ni_3$Ti in turn to suppress its growth, thus ensuring the nanoprecipitates to be fine and dispersed. Meanwhile, a nano-scale $\alpha'$-Cr phase is also formed inside the martensitic laths. The newly formed Mo-enriched R' phase, $Ni_3$Ti and $\alpha'$-Cr provide together a high strength for the matrix. In addition, with the coherent strain energy at interfaces of the matrix, $Ni_3$Ti with a DO24 structure in dispersed distribution is driven to form nano-scale reverted austenite through the climbing of edge dislocations and the diffusion of Fe atoms. The reverted austenite formed is dispersed in the matrix evenly and is prone to a transformation-induced plasticity (TRIP) effect, thereby effectively relieving stress concentration.

In addition, the distribution of the highly alloyed Fe, Cr, Co, Ni and Mo elements to the lath boundary make the composition at the lath boundary become a close-to-eutectic composition, which improves the formation ability of amorphous substance so as to change the segregation at boundary to an amorphous state. During homogeneous deformation, the amorphous phase may promote dislocation multiplication to provide plasticity and strength on the one hand, and absorb dislocations to avoid fractures caused by the entanglement and hardening due to the excessive dislocations so as to further provide work hardening on the other hand, thereby achieving both an ultrahigh strength and a high plasticity.

In the present disclosure, an important innovation is to significantly reduce the content of expensive alloying element Co, thereby reducing cost while improving corrosion resistance. In the present disclosure, the content of Co is designed at a quite low level, reducing the formation of Ni—Ti clusters. However, an ultrahigh strength is achieved by the synergistic strengthening of various nanoprecipitates through optimization of alloying elements, VIM-VAR and corresponding thermomechanical treatments. Meanwhile, an amorphous layer is introduced into a lath boundary, and the lath boundary modified by the amorphous layer promotes dislocation multiplication and absorbs the dislocations, thereby achieving high plasticity and great work hardening capacity. In the present disclosure, based on the innovations in strengthening mechanism and corresponding composition and thermomechanical treatment design, a simple and controllable process is realized, and the mechanical properties and corrosion resistance are effectively improved.

Composition design basis. Co is one of the important elements to be considered. Co may elevate the Ms point to ensure that the matrix is martensite. Nevertheless, Co is a double-edged sword for a martensitic precipitation-strengthened stainless steel. Co may decrease the solubility of Ti and Mo in a martensite matrix to thus form nanoprecipitates containing Mo or Ti, thereby increasing the strength. Meanwhile, Co may also hinder recovery of dislocations, reduce the size of the precipitated phases and stabilize the matrix, thereby producing a relatively high secondary hardening. However, Co may promote the spinodal decomposition of Cr in maraging stainless steel, and a higher content of Co leads to a greater extent of spinodal decomposition of Cr, which may reduce the pitting corrosion resistance of the matrix. In view of the corrosion resistance, Co should be introduced in an appropriate amount. Moreover, the element Co is relatively expensive, and thus a higher content of Co means a higher cost of the raw materials for ultrahigh-strength maraging stainless steel. Based on a comprehensive consideration, the mass percentage of Co is controlled within a range of 1.0-5.0%, for example 1.0%, 1.5%, 2.0%, 2.5%, 3.0%, 3.5%, 4.0%, 4.5% and 5.0%.

Ni is an important element for forming the intermetallic compounds. In an early stage, B2-Ni(Ti, Mn) and $\eta$-$Ni_3$(Ti, Mo) are formed to strengthen the matrix, and $\eta$-$Ni_3$(Ti, Mo) is also the core for nucleation of a Mo-enriched R' phase. In addition, Ni may strengthen the matrix to provide certain plasticity and toughness for the stainless steel of the present disclosure. Ni may also improve the hardenability of martensite. Moreover, Ni is a main element for the formation of reverted austenite. However, an excessive content of Ni promotes the generation of retained austenite in the matrix, thus affecting the strength of stainless steel. Based on a comprehensive consideration, the mass percentage of Ni is controlled within a range of 6.0-10.0%, for example 6.0%, 6.5%, 7.0%, 7.5%, 8.0%, 8.5%, 9.0%, 9.5% and 10.0%.

Mo is a very important element for precipitation strengthening. Mo is one of the main elements to form a Mo-enriched R' phase and $Ni_3$(Ti, Mo). The Mo-enriched R' phase is formed via long time of aging and wraps $Ni_3$Ti to form fine core-shell structures in dispersed distribution to effectively improve the strength. Mo is also an effective element for corrosion resistance, and may significantly improve the corrosion resistance of materials. Meanwhile, Mo is an element for forming ferrite. An excessive content of Mo may increase the precipitation tendency of $\delta$ ferrite, increasing the content of $\delta$ ferrite and deteriorating the performances of materials. Based on a comprehensive consideration, the mass percentage of Mo is controlled within a range of 3.0-7.0%, for example 3.0%, 3.5%, 4.0%, 4.5%, 5.0%, 5.5%, 6.0%, 6.5% and 7.0%.

Cr is a very important element in stainless steel. Cr generally has a mass percentage of greater than 10% to ensure the corrosion resistance of stainless steel. However, Cr is an element for forming ferrite, and an excessive content of Cr may increase the content of $\delta$ ferrite in matrix, thereby affecting the strength and toughness and the corrosion resistance of materials. Therefore, based on a comprehensive consideration, the mass percentage of Cr is controlled within a range of 11.0-17.0%, for example 11.0%, 11.5%, 12.0%, 12.5%, 13.0%, 13.5%, 14.0%, 14.5%, 15.0%, 15.5%, 16.0%, 16.5% and 17.0%.

Si is an important element for novel stainless steels. Si is one of the main elements for forming a Mo-enriched R' phase, and may effectively promote the formation of the Mo-enriched R' phase. Si may also effectively inhibit the precipitation and growth of carbides in a martensite matrix during tempering, thereby preventing the appearance of Cr-depleted regions that reduce corrosion resistance. However, an excessive content of Si may seriously deteriorate the plasticity of materials. Based on a comprehensive consideration, the mass percentage of Si is controlled within a range of 0.08-0.50%, for example 0.08%, 0.1%, 0.15%, 0.20%, 0.25%, 0.30%, 0.35%, 0.40%, 0.45% and 0.50%.

Ti is a main element for forming strengthening phases, and may form Ni—Ti clusters at an initial stage preparing for the subsequent precipitation of the strengthening phases. An excessive content of Ti may increase the precipitation tendency of the precipitated phases at the boundary of the martensitic laths. An excessive amount of precipitated phases at boundary of martensitic laths are highly prone to evolve into a source of crack, which extends along the boundary of the martensitic laths to cause quasi-cleavage cracking. Based on a comprehensive consideration, the mass percentage of Ti is controlled within a range of 0.3-2.0%, for example 0.3%, 0.5%, 0.8%, 1.0%, 1.5% and 2.0%.

Mn is substantially involved in the precipitation of nano-phases to form Ni(Mn, Ti, Mo) intermetallic compounds. Therefore, Mn may be used to replace Ti and Mo elements in a small amount to reduce costs. Mn is also a main element for affecting reverted austenite. However, an excessive content of Mn causes serious segregation, increased thermal stress and structural stress and reduced weldability of billets. Based on a comprehensive consideration, the mass percentage of Mn is controlled within a range of 0.08-1.0%, for example 0.08%, 0.1%, 0.2%, 0.3%, 0.4%, 0.5%, 0.6%, 0.7%, 0.8%, 0.9% and 1.0%.

C exists as an impurity element in matrix in the stainless steel of the present disclosure. When the content of C is excessively high, carbides of MX or $M_{23}C_6$ (M=Cr, Ti) may be formed. These carbides seriously retard the formation of reverted austenite and offset the benefits of high dislocation density brought by cold rolling; moreover, the carbides with an excessive size may seriously deteriorate the toughness and corrosion resistance of the steel. Therefore, the content of C is strictly controlled to be 0.02% or less. P and S are also impurity elements, and an increase in their contents may seriously deteriorate the performances of stainless steel likewise. Therefore, the contents of P and S are strictly controlled.

The method for preparing the ultrahigh-strength maraging stainless steel with multiphase strengthening according to the present disclosure comprises:
1) proportioning alloying elements;
2) vacuum smelting for an electrode in a vacuum induction melting furnace;
3) vacuum arc remelting;
4) high-temperature homogenizing annealing;
5) forging or hot rolling for cogging;
6) cold rolling deformation; and
7) heat treating.

After smelting, the alloy is molded and cooled to room temperature, and then subjected to thermomechanical treatments after cutting off the riser and peeling off the surface skin. With the procedures of hot rolling for cogging, cold rolling deformation and heat treating, a uniform and fine structure may be obtained with a high strength, toughness and corrosion resistance.

In some embodiments, in step 1), the proportioning of alloying elements comprises: taking metal chromium, metal nickel, metal manganese, metal molybdenum, metal cobalt, metal titanium, iron-silicon, and pure iron and inevitable impurities as a balance, according to a mass percentage of each element in the stainless steel.

In some embodiments, in step 2), the vacuum smelting for an electrode in a vacuum induction melting furnace is conducted by high-vacuum smelting throughout at a vacuum degree of 0.1 Pa or less; pure iron, metal nickel, metal molybdenum and metal cobalt are added with the furnace, metal chromium and metal titanium are added from an overhead bunker, and industrial silicon and metal manganese are added from an alloy bunker; after the materials added with the furnace are molten down, the metals from the overhead bunker are added, molten totally and subjected to deoxidation alloying, and the metals from the alloy bunker are finally added; during smelting, refining is conducted at a temperature within a range of 1,550-1,650° C. for not less than 60 min under stirring for not less than 10 min; then smelting composition is sampled on site and analyzed, and then is adjusted according to the target as above to achieve a target composition; pouring is conducted at a temperature within a range of 1,530-1,550° C., and heat preservation is conducted normally on a riser.

In some embodiments, in step 3), the vacuum arc remelting is conducted at a melting rate within a range of 100-260 Kg/h, and during the remelting, a vacuum degree is maintained at $10^{-2}$ Pa or less.

In some embodiments, in step 4), the high-temperature homogenizing annealing includes: heating with the furnace in air, vacuum or a protective atmosphere at a rate of 100-180° C./h to a temperature within a range of 600-900° C. and maintaining for 4-8 h, subsequently heating to a temperature within a range of 1,100-1,300° C. and maintaining for 20-50 h, and then conducting furnace cooling, air cooling or oil cooling to room temperature.

In some embodiments, in step 5), the forging or hot rolling produces a square ingot or a round ingot; the forging or hot rolling for cogging is conducted under conditions as follows: a billet is heated to a temperature within a range of 1,100-1,300° C. and maintained for 10-24 h for discharging and rolling; the forging or hot rolling begins at a temperature of 1,100° C. or higher and ends at a temperature of 950° C. or higher; a hot rolled sheet stock has a total rolling reduction of not less than 50%, and a forged billet has a forging ratio of not less than 6; after the forging or hot rolling, a resultant is cooled in an ice-water mixture to room temperature.

In some embodiments, in step 6), the cold rolling deformation is conducted as follows: a cold rolled sheet stock has a total rolling reduction of not less than 65%; a tube stock, a bar stock, a wire stock or a section material is cold deformed by reciprocating tube rolling, groove rolling, universal rolling or drawing to obtain a size and specification of a product as required.

In some embodiments, in step 7), the heat treating includes: high-temperature quenching treatment, cryogenic treatment and aging treatment.

In some embodiments, in step 7), the high-temperature quenching treatment is conducted by maintaining at temperature within a range of 1,050-1,200° C. for 5-30 min, and then quenching in an ice-water mixture at 0° C. for cooling.

In some embodiments, in step 7), the cryogenic treatment is conducted with the liquid nitrogen for 4-10 h, followed by returning to room temperature.

In some embodiments, in step 7), the aging treatment is conducted at a temperature within a range of 450-600° C. for 0.5-500 h, followed by air cooling or quenching to room temperature.

The present disclosure has the following beneficial effects: 1) compared with other high-strength stainless steels, in the present disclosure, the content of precious metals is relatively low and the cost of raw materials is reduced; 2) the method as provided in the present disclosure is simple and highly controllable since stainless steels with various strength grades may be prepared just by varying the heat treatments, and thus is applicable for industrial production. Accordingly, a stainless steel with desirable corrosion resistance and excellent mechanical property is obtained. The maraging stainless steel has a tensile strength up to 2,700 MPa, an elongation as high as 10% and a pitting potential up to 0.17 $V_{SCE}$.

DETAILED DESCRIPTION OF THE EMBODIMENTS

Hereinafter, the ultrahigh-strength maraging stainless steel with multiphase strengthening and the preparation method thereof according to the present disclosure will be further explained and illustrated with reference to the drawings and examples, which should not be regarded as an improper limitation to the technical solutions of the present disclosure.

Example 1

Pure iron, metal chromium, metal nickel, metal manganese, metal molybdenum, metal cobalt, metal titanium and iron-silicon were taken as raw materials according to a composition of stainless steel in mass percentage as follows: 3.0% of Co, 11.0% of Cr, 0.08% of Mn, 5.0% of Mo, 8.0% of Ni, 0.4% of Si, 2.0% of Ti, 0.02% or less of C, 0.003% or less of P, 0.003% or less of S, and Fe as a balance. C, P and S were inevitable impurities.

A billet was prepared by vacuum melting throughout.

The high-temperature homogenizing annealing was conducted as follows: the billet was heated with a furnace in air at a heating rate of 100° C./h to 700° C. and maintained for 4 h, then was heated to 1,100° C. and maintained for 20 h, and then was cooled with the furnace to room temperature.

The hot rolling for cogging was conducted under the following conditions: the billet was heated to 1,100° C. and maintained for 10 h, and then was discharged and rolled; the hot rolling began at a temperature of 1,100±20° C. and ended at a temperature of 950° C. or higher; the hot rolled sheet stock had a total rolling reduction of 50%, and was cooled in an ice-water mixture.

The sheet stock was cold rolled with a total rolling reduction of 65%.

The sheet stock above was subjected to a high-temperature quenching treatment by being maintained at 1,200° C. for 5 min and then cooled in an ice-water mixture at 0° C. for quenching; subsequently, the sheet stock was subjected to a cryogenic treatment with liquid nitrogen for 5 h and returned to room temperature; thereafter, the sheet stock was subjected to an aging treatment at 450° C. for 20 h, and then air-cooled to room temperature.

Figure 1:
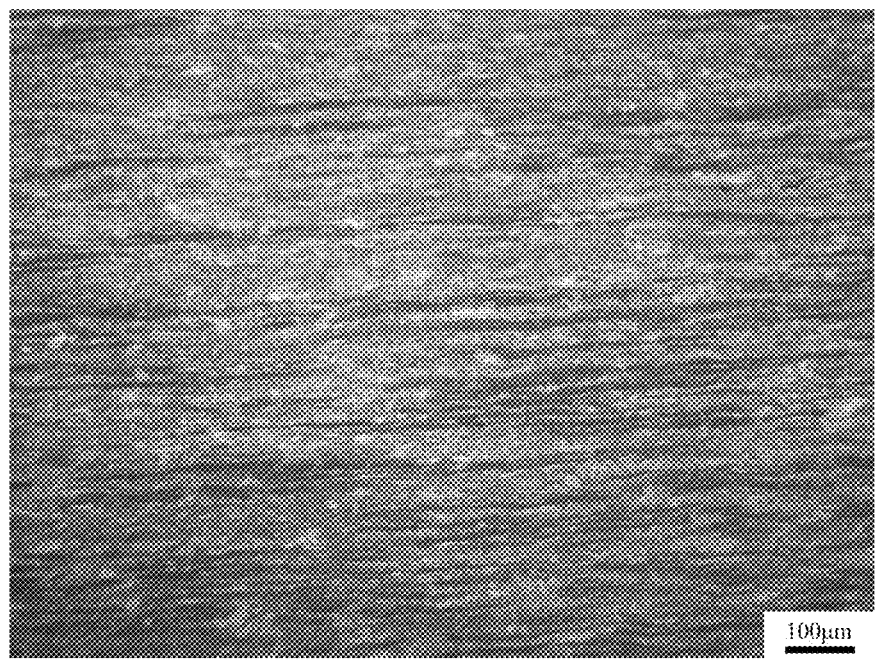
FIG. 1 shows a metallographic morphology image after aging treatment in Example 1.
Figure 2:
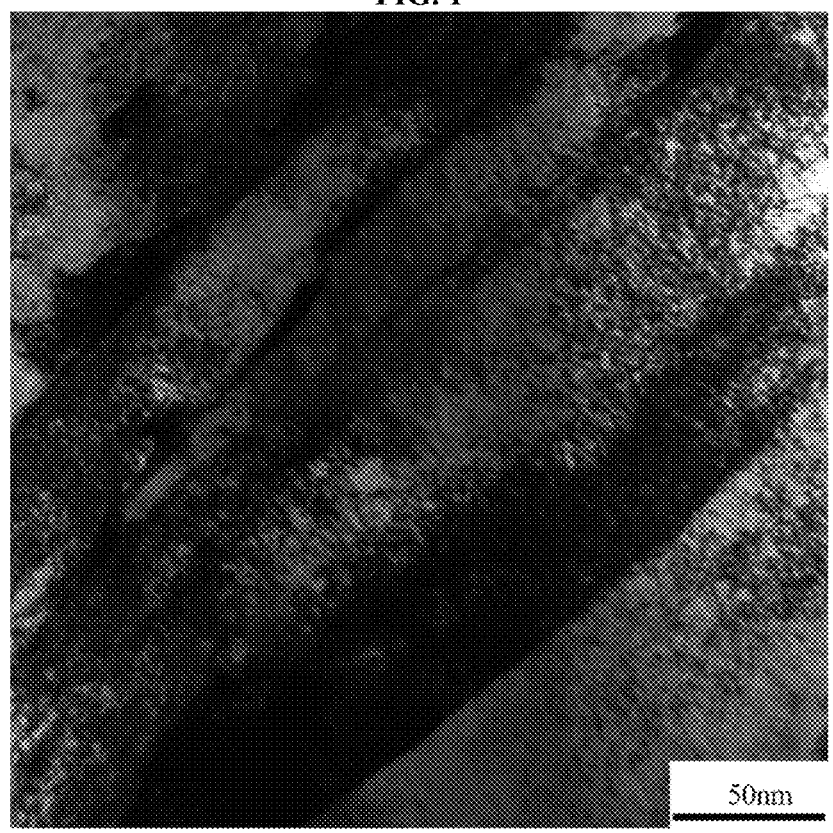
FIG. 2 shows a transmission electron microscope (TEM) image after aging treatment in Example 1.

The mechanical properties of Example 1 are shown in Table 1. The stainless steel sample has an average hardness of 569.3 HV, yield strength of 2,260 MPa, a tensile strength of 2,690 MPa, an elongation of 8.2% and a pitting potential of 0.14 $V_{SCE}$. FIG. 1 shows a metallographic morphology image after aging treatment of Example 1. FIG. 2 shows a TEM image after aging treatment of Example 1, where a large amount of dislocations are observed in martensitic laths.

Example 2

Pure iron, metal chromium, metal nickel, metal manganese, metal molybdenum, metal cobalt, metal titanium and iron-silicon were taken as raw materials according to a composition of stainless steel in mass percentage as follows: 1.0% of Co, 12.0% of Cr, 0.5% of Mn, 6.0% of Mo, 9.0% of Ni, 0.5% of Si, 1.5% of Ti, 0.02% or less of C, 0.003% or less of P, 0.003% or less of S, and Fe as a balance. C, P and S were inevitable impurities.

A billet was prepared by vacuum melting throughout.

The high-temperature homogenizing annealing was conducted as follows: the billet was heated with a furnace in air at a heating rate of at 100° C./h to 700° C. and maintained for 4 h, then was heated to 1,150° C. and maintained for 20 h, and then was cooled with the furnace to room temperature.

The hot rolling for cogging was conducted under the following conditions: the billet was heated to 1,200° C. and maintained for 30 h, and then was discharged and rolled; the hot rolling began at a temperature of 1,150±20° C. and ended at a temperature of 950° C. or higher; the hot rolled sheet stock had a total rolling reduction of 50%, and was cooled in an ice-water mixture.

The sheet stock was cold rolled with a total rolling reduction of 85%.

The sheet stock above was subjected to a high-temperature quenching treatment by being maintained at 1,200° C. for 5 min and then cooled in an ice-water mixture at 0° C. for quenching; subsequently, the sheet stock was subjected to a cryogenic treatment with liquid nitrogen for 7 h and returned to room temperature; thereafter, the sheet stock was subjected to an aging treatment at 520° C. for 30 h, and then air-cooled to room temperature.

Figure 3:
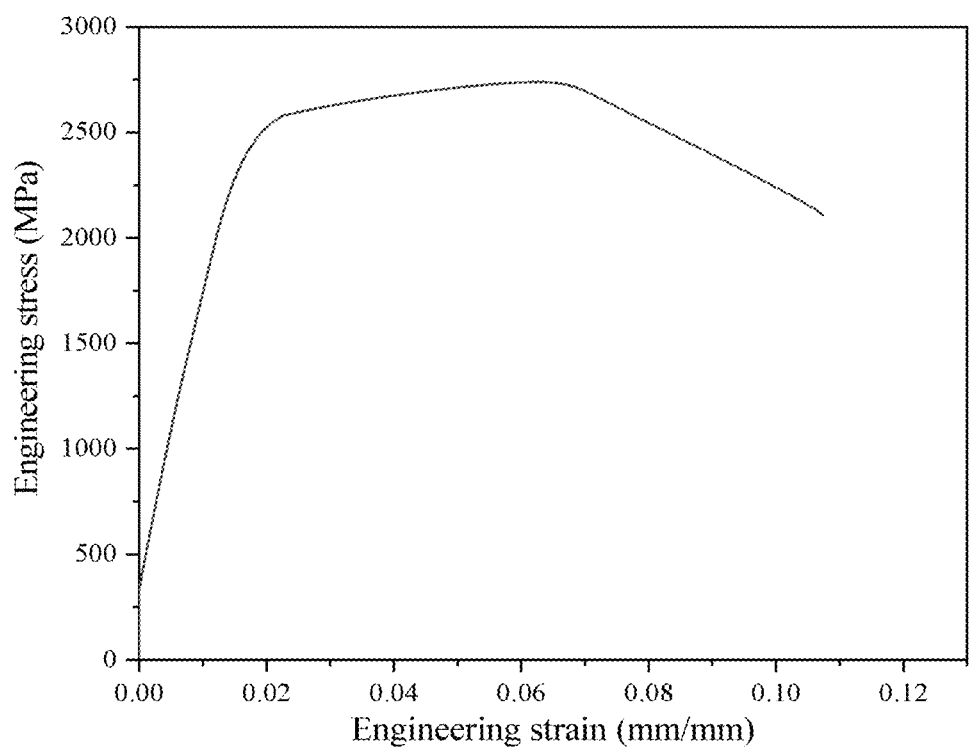
FIG. 3 shows a engineering stress-strain graph after aging treatment in Example 2, where the abscissa refers to engineering strain and the ordinate refers to engineering stress.
Figure 4:
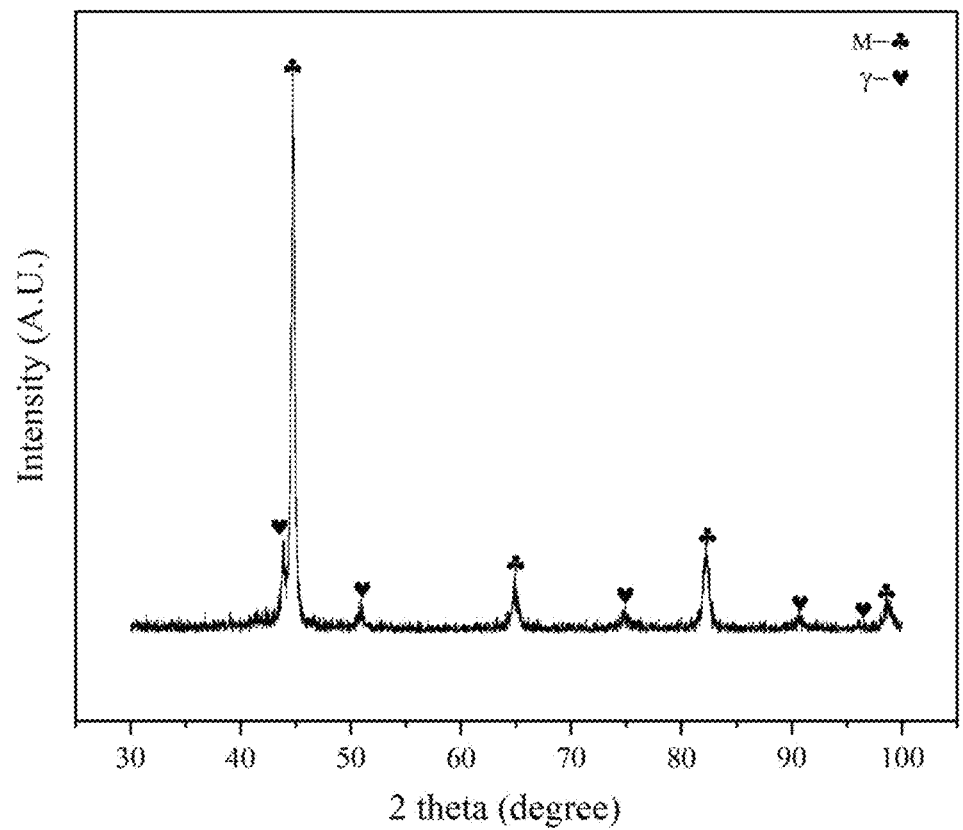
FIG. 4 shows an X-ray diffraction (XRD) graph after aging treatment in Example 2, in which the abscissa refers to scanning angle and the ordinate refers to diffraction intensity.
Figure 5:
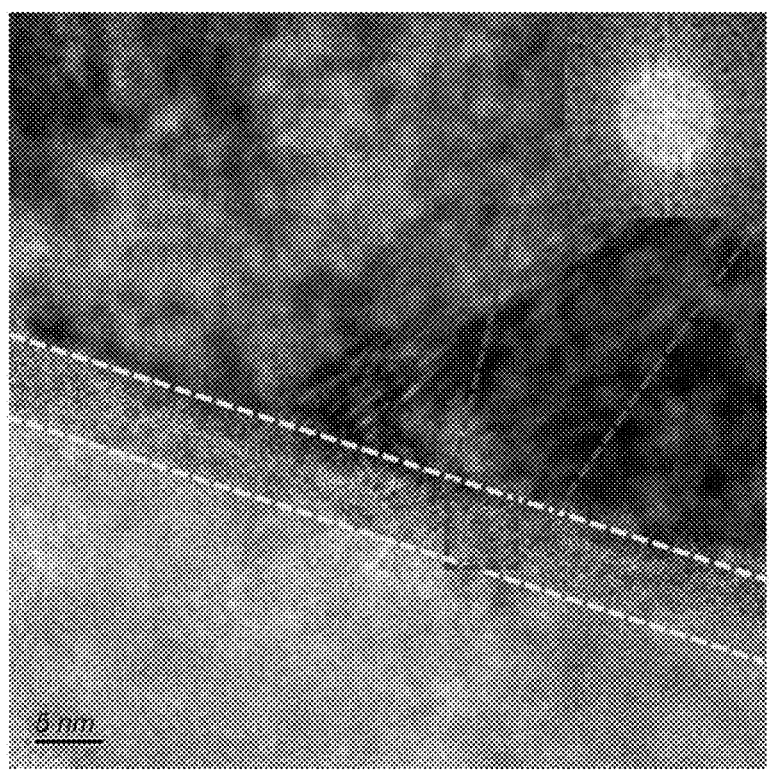
FIG. 5 shows an image of an amorphous ring on a lath boundary after aging treatment in Example 2.

The mechanical properties of Example 2 are shown in Table 1. The stainless steel sample has an average hardness of 578.1 HV, yield strength of 2,280 MPa, a tensile strength of 2,740 MPa, an elongation of 10.5% and a pitting potential of 0.17 $V_{SCE}$. FIG. 3 shows a stress-strain graph after aging treatment of Example 2. FIG. 4 shows an XRD graph after aging treatment of Example 2, where a precipitation of reverted austenite is observed. FIG. 5 shows an image of an amorphous ring on a lath boundary after aging treatment of Example 2.

In the examples above, the testing methods for corrosion resistance, hardness and tensile properties of the ultrahigh-strength maraging stainless steel with multiphase strengthening are as follows.

1) Hardness: a hardness test was conducted on an HVS-50 Vickers hardness tester with a load of 1 Kg; an average value was taken after 5 dotting, and the results were listed in Table 1.
2) Tensile mechanical properties: a tensile test was conducted on an electronic universal testing machine; the samples were prepared as rectangular samples with a nominal size of (2-3) mm×4 mm×20.6 mm; for each of the tensile strength, yield strength and elongation, an average value was taken from three samples treated identically, and the results were listed in Table 1.
3) Corrosion Resistance A sample was processed into a specification of 10 mm×10 mm×2 mm, and was exposed to 1 cm² for experiment after being encapsulated with epoxy resin. The surface of the sample was polished to 2000 # with sandpaper, scrubbed with ethyl alcohol to remove oil stains, washed with deionized water and air dried for later use. An experiment was conducted with a solution of 0.1M $Na_2SO_4$+xNaCl (pH=3) at temperature of 25° C. The electrochemical experiment was conducted using a CHI660E electrochemical workstation. The electrochemical experiment was conducted with a common three-electrode system, where the ultrahigh-strength stainless steel sample was used as a working electrode, a Pt sheet was used as an auxiliary electrode and a saturated calomel electrode (SCE) was used as a reference electrode. Before the electrochemical experiment, the sample was applied with a potential of −1.2 $V_{SEC}$ and subjected to potentiostatic polarization for 5 min to remove the oxide membrane formed on surface of the sample in the air. The system was stabilized for 30 min and recording was started. Potentiodynamic polarization was conducted at a scanning rate of 0.5 mV/S within a scanning potential range of −0.3 V (vs. open circuit potential $E_{OC}$) to 1.5 V (vs. reference electrode potential $E_R$), and the experiment was stopped after current varied stably. An average value was taken from three measurements and the results were listed in Table 1.

3) vacuum arc remelting;
4) homogenizing annealing;
5) forging or hot rolling for cogging;
6) cold rolling deformation; and
7) heat treating,
wherein the maraging stainless steel with multiphase strengthening has a composition as follows in mass percentage: 1.0-5.0% of Co, 6.0-10.0% of Ni, 11.0-17.0% of Cr, 0.3-2.0% of Ti, 3.0-7.0% of Mo, 0.08-1.0% of Mn, 0.08-0.5% of Si, 0.02% or less of C, 0.003% or less of P, 0.003% or less of S, and Fe as a balance.

2. The method according to claim 1, wherein in step 1), the proportioning of alloying elements comprises: taking metal chromium, metal nickel, metal manganese, metal molybdenum, metal cobalt, metal titanium, iron-silicon, and pure iron and inevitable impurities as a balance, according to a mass percentage of each element in the maraging stainless steel.

3. The method according to claim 1, wherein in step 2), the vacuum smelting for an electrode in a vacuum induction melting furnace is conducted by high vacuum smelting throughout at a vacuum degree of 0.1 Pa or less; pure iron, metal nickel, metal molybdenum and metal cobalt are added with the vacuum induction melting furnace, metal chromium and metal titanium are added from an overhead bunker, and industrial silicon and metal manganese are added from an alloy bunker; after materials added with the vacuum induction melting furnace are molten down, metals from the overhead bunker are added, molten totally and subjected to deoxidation alloying, and the industrial silicon and the metal manganese from the alloy bunker are finally added; during smelting, refining is conducted at a temperature within a range of 1,550-1,650° C. for not less than 60 min under stirring for not less than 10 min; smelting composition is sampled on site and analyzed, and then is adjusted to achieve a target composition; pouring is conducted at a temperature within a range of 1,530-1,550° C., and heat preservation is conducted on a riser.

4. The method according to claim 1, wherein in step 3), the vacuum arc remelting is conducted at a melting rate within a range of 100-260 Kg/h, and during the vacuum arc remelting, a vacuum degree is maintained at $10^{-2}$ Pa or less.

5. The method according to claim 1, wherein in step 4), the homogenizing annealing comprises: heating with a fur-

TABLE 1

Composition, hardness, tensile properties and pitting potential of examples

| | Chemical composition/% | | | | | | | | Aging process | Average hardness/ HV | Yield strength/ MPa | Tensile strength/ MPa | Elongation/% | Pitting potential/ $V_{SCE}$ |
|---|---|---|---|---|---|---|---|---|---|---|---|---|---|---|
| | Co | Ni | Cr | Ti | Mo | Mn | Si | Fe | | | | | | |
| Example 1 | 3.0 | 8.0 | 11 | 2 | 5 | 0.08 | 0.4 | Bal. | 450° C. 20 h | 569.3 | 2260 | 2690 | 8.2 | 0.14 |
| Example 2 | 4.0 | 9.0 | 12 | 1.5 | 6 | 0.5 | 0.5 | Bal. | 520° C. 30 h | 578.1 | 2280 | 2740 | 10.5 | 0.17 |

Note:
The contents of components such as C, P and S in examples in Table 1 conform to the elemental composition of the stainless steel according to the present disclosure. The content of C is 0.02% or less, the content of P is 0.003% or less and the content of S is 0.003% or less, all of which are not listed in Table 1. The abbreviation Bal. represents balance.

What is claimed is:
1. A method for preparing maraging stainless steel with multiphase strengthening, comprising:
1) proportioning alloying elements;
2) vacuum smelting for an electrode in a vacuum induction melting furnace;

nace in air, vacuum or a protective atmosphere at a rate of 100-180° C./h to a temperature within a range of 600-900° C. and maintaining for 4-8 h, then heating to a temperature within a range of 1,100-1,300° C. and maintaining for 20-50 h, and then conducting furnace cooling, air cooling or oil cooling to room temperature.

6. The method according to claim 1, wherein in step 5), the forging or hot rolling produces a square ingot or round ingot; the forging or hot rolling for cogging is conducted under conditions as follows: a billet is heated to a temperature within a range of 1,100-1,300° C. and maintained for 10-24 h for discharging and rolling; the forging or hot rolling begins at a temperature of 1,100° C. or higher and ends at a temperature of 950° C. or higher; a hot rolled sheet stock has a total rolling reduction of not less than 50%, and a forged billet has a forging ratio of not less than 6; after the forging or hot rolling, a resultant is cooled in an ice-water mixture to room temperature.

7. The method according to claim 1, wherein in step 6), the cold rolling deformation is conducted as follows: a cold rolled sheet stock has a total rolling reduction of not less than 65%; a tube stock, a bar stock, a wire stock or a section material is cold deformed by reciprocating tube rolling, groove rolling, universal rolling or drawing to obtain a size and specification of a product as required.

8. The method according to claim 1, wherein in step 7), the heat treating comprises: quenching treatment, cryogenic treatment and aging treatment.

9. The method according to claim 8, wherein the quenching treatment is conducted by maintaining at a temperature within a range of 1,050-1,200° C. for 5-30 min, and then quenching in an ice-water mixture at 0° C. for cooling.

10. The method according to claim 8, wherein the cryogenic treatment is conducted with liquid nitrogen for 4-10 h, followed by returning to room temperature.

11. The method according to claim 8, wherein the aging treatment is conducted at a temperature within a range of 450-600° C. for 0.5-500 h, followed by air cooling or quenching to room temperature.

* * * * *